(12) United States Patent
Sims et al.

(10) Patent No.: US 10,975,986 B2
(45) Date of Patent: Apr. 13, 2021

(54) SECUREMENT MEMBER FOR AN ELECTRICAL CONDUCTOR

(71) Applicant: Hubbell Incorporated, Shelton, CT (US)

(72) Inventors: Heidi Patricia Sims, Centralia, MO (US); Austin Dee Hinkle, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/207,879

(22) Filed: Dec. 3, 2018

(65) Prior Publication Data

US 2019/0170272 A1 Jun. 6, 2019

Related U.S. Application Data

(60) Provisional application No. 62/593,612, filed on Dec. 1, 2017.

(51) Int. Cl.
| | | |
|---|---|---|
| *F16L 3/137* | (2006.01) | |
| *F16L 3/233* | (2006.01) | |
| *B65D 63/10* | (2006.01) | |
| *H02G 3/32* | (2006.01) | |

(52) U.S. Cl.
CPC .......... *F16L 3/137* (2013.01); *B65D 63/1027* (2013.01); *H02G 3/32* (2013.01); *B65D 2563/101* (2013.01); *F16L 3/2336* (2013.01)

(58) Field of Classification Search
CPC .... F16L 3/137; F16L 3/2336; B65D 63/1027; B65D 63/00; B65D 63/02; B65D 63/04; B65D 63/06; B65D 63/08; B65D 2563/101
USPC .............. 248/74.3, 71; 24/16 R, 16 PB
See application file for complete search history.

(56) References Cited

U.S. PATENT DOCUMENTS

| | | | |
|---|---|---|---|
| 3,241,800 A | * | 3/1966 | Richter, III ............ A47G 33/08 248/230.9 |
| 3,654,669 A | | 4/1972 | Fulton |
| 3,949,449 A | * | 4/1976 | Caveney ............ B65D 63/1072 24/16 PB |

(Continued)

FOREIGN PATENT DOCUMENTS

CN 204341662 5/2015

OTHER PUBLICATIONS

PCT/US2018/063611 International Search Report and Written Opinion dated Mar. 4, 2019 (16 pages).

*Primary Examiner* — Nkeisha J Smith
(74) *Attorney, Agent, or Firm* — Michael Best & Friedrich, LLP (57) ABSTRACT

A securement member for an electrical conductor includes a main body with a body axis and a stepped surface. The stepped surface is perpendicular to the body axis. The stepped surface also extends along a perimeter of the main body. The main body also has a first aperture and a second aperture. Both the first aperture and the second aperture extend through the main body. The electrical conductor further includes a strap integrally formed with the main body. The strap extends away from the main body and has a width less than a width of the first aperture and the second aperture. The strap is selectively receivable within the first aperture and the second aperture in order to secure electrical conductors to the main body.

16 Claims, 6 Drawing Sheets

(56) References Cited

U.S. PATENT DOCUMENTS

| | | | | |
|---|---|---|---|---|
| 4,397,435 A * | 8/1983 | Fisher | ............... | F16L 3/00 |
| | | | | 24/21 |
| 4,562,982 A * | 1/1986 | McSherry | ............... | H02G 7/06 |
| | | | | 248/61 |
| 4,899,963 A * | 2/1990 | Murphy | ............... | F16L 3/137 |
| | | | | 24/16 R |
| 4,909,051 A * | 3/1990 | Lee | ............... | E05B 75/00 |
| | | | | 128/878 |
| 5,395,343 A * | 3/1995 | Iscovich | ............... | A61M 25/02 |
| | | | | 128/DIG. 26 |
| 5,954,302 A * | 9/1999 | Robertson | ............... | F16L 3/04 |
| | | | | 248/73 |
| 6,129,317 A * | 10/2000 | Rodrigues | ............... | F16L 3/137 |
| | | | | 248/49 |
| 6,364,257 B1 * | 4/2002 | Holder | ............... | F16L 3/2336 |
| | | | | 24/16 PB |
| 6,880,787 B2 * | 4/2005 | Stephen | ............... | F16B 35/06 |
| | | | | 174/53 |
| 9,630,758 B2 * | 4/2017 | Kozminske | ............... | B65D 63/1027 |
| 9,958,089 B2 * | 5/2018 | Geiger | ............... | F16L 3/137 |
| 2007/0023586 A1 | 2/2007 | Geiger | | |
| 2011/0131768 A1 * | 6/2011 | Watson | ............... | B65D 63/1063 |
| | | | | 24/16 PB |
| 2012/0291231 A1 | 11/2012 | Ku | | |
| 2016/0091122 A1 * | 3/2016 | Geiger | ............... | F16L 3/137 |
| | | | | 248/61 |
| 2018/0244447 A1 * | 8/2018 | Chmelar | ............... | B65D 63/1027 |

* cited by examiner

SECUREMENT MEMBER FOR AN ELECTRICAL CONDUCTOR

CROSS-REFERENCE TO RELATED APPLICATION

This application claims the benefit of prior-filed U.S. Provisional Patent Application No. 62/593,612, filed Dec. 1, 2017, the entire contents of which are incorporated by reference.

BACKGROUND

The present disclosure relates to a securement member for cables and, more specifically, to an integrated spacer and tie for spacing and securing cables with a single component.

SUMMARY

In one aspect, a securement member for an electrical conductor includes a main body with a body axis and a stepped surface. The stepped surface is perpendicular to the body axis. The stepped surface also extends along a perimeter of the main body. The main body also has a first aperture and a second aperture. Both the first aperture and the second aperture extend through the main body. The securement member further includes a strap integrally formed with the main body. The strap extends away from the main body and has a width less than a width of the first aperture and the second aperture. The strap is selectively receivable within the first aperture and the second aperture in order to secure electrical conductors to the main body.

In another aspect, a securement member for securing electrical conductors is configured to couple to an adapter. The securement member includes a main body with a first portion and a second portion integrally formed with the first portion. The first portion and the second portion extend along a body axis. A stepped surface is positioned between the first portion and the second portion. The stepped surface is perpendicular to the body axis and the stepped surface extends along at least a portion of the perimeter of the main body. The stepped surface also includes a projection. The projection is configured to engage an adapter. The main body also has a first aperture and a second aperture. Both the first aperture and the second aperture extend through the main body. The electrical conductor further includes a strap integrally formed with the main body. The strap extends away from the main body and has a width less than a width of the first aperture and the second aperture. The strap is selectively receivable within the first aperture and the second aperture in order to secure electrical conductors to the main body.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In general, the present disclosure relates to a securement member with an integrated spacer and tie for retaining cables in addition to spacing cables apart. Adapters may couple to the securement members to increase the spacing between the cables.

Figure 1:
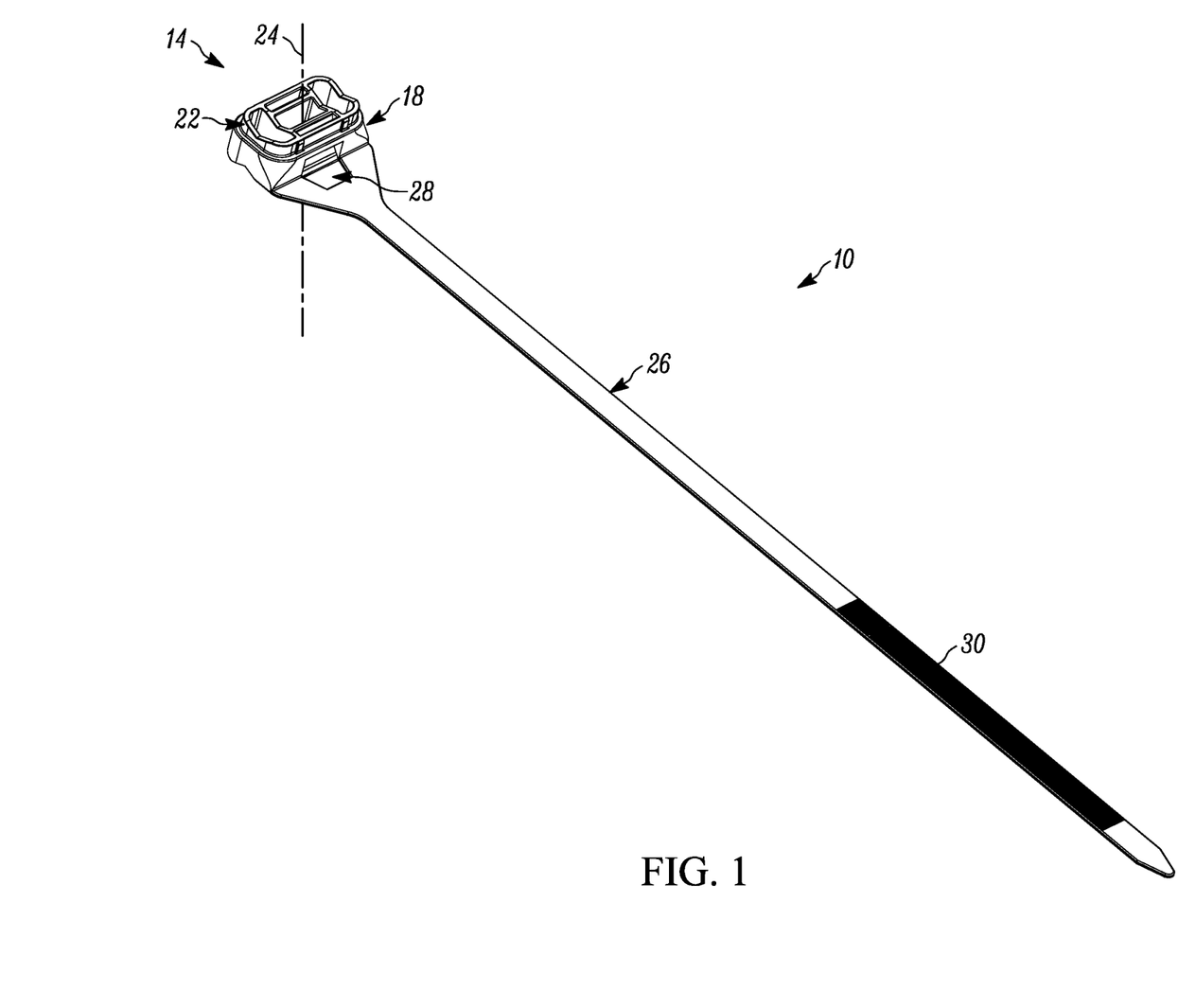
FIG. 1 is a perspective view of a securement member.

As shown in FIG. 1, the securement member or integrated spacer cable tie 10 includes a main body 14. In the illustrated embodiment, the integrated cable spacer tie 10 is a molded part. The main body 14 has a first portion 18 and a second portion 22. The first portion 18 and the second portion 22 are formed integrally with one another. The first portion 18 and the second portion 22 are also aligned along a body axis 24. In the illustrated embodiment, the first portion 18 and the second portion 22 have a rectangular profile.

Figure 2:
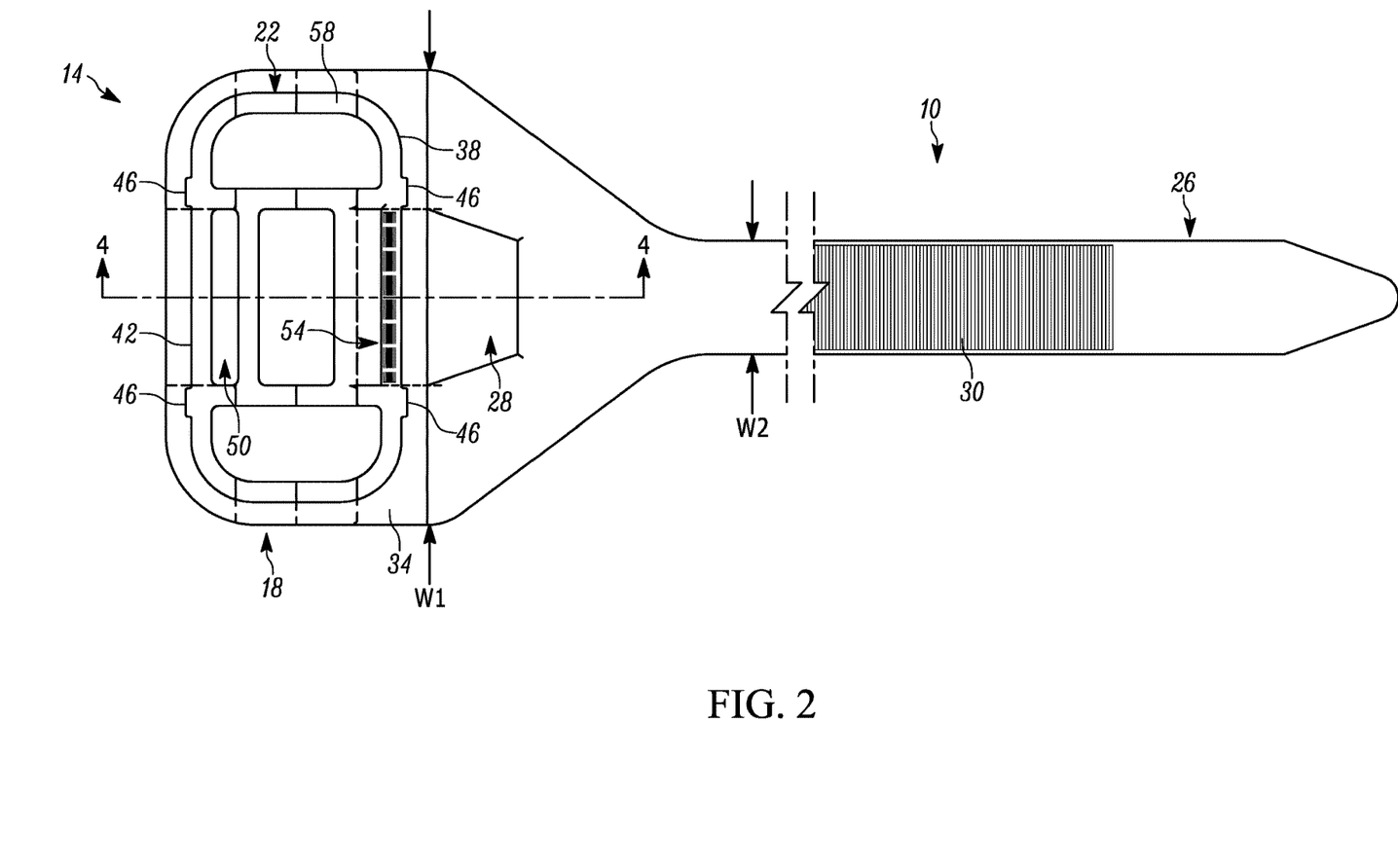
FIG. 2 is a top view of the securement member of FIG. 1.
Figure 3:
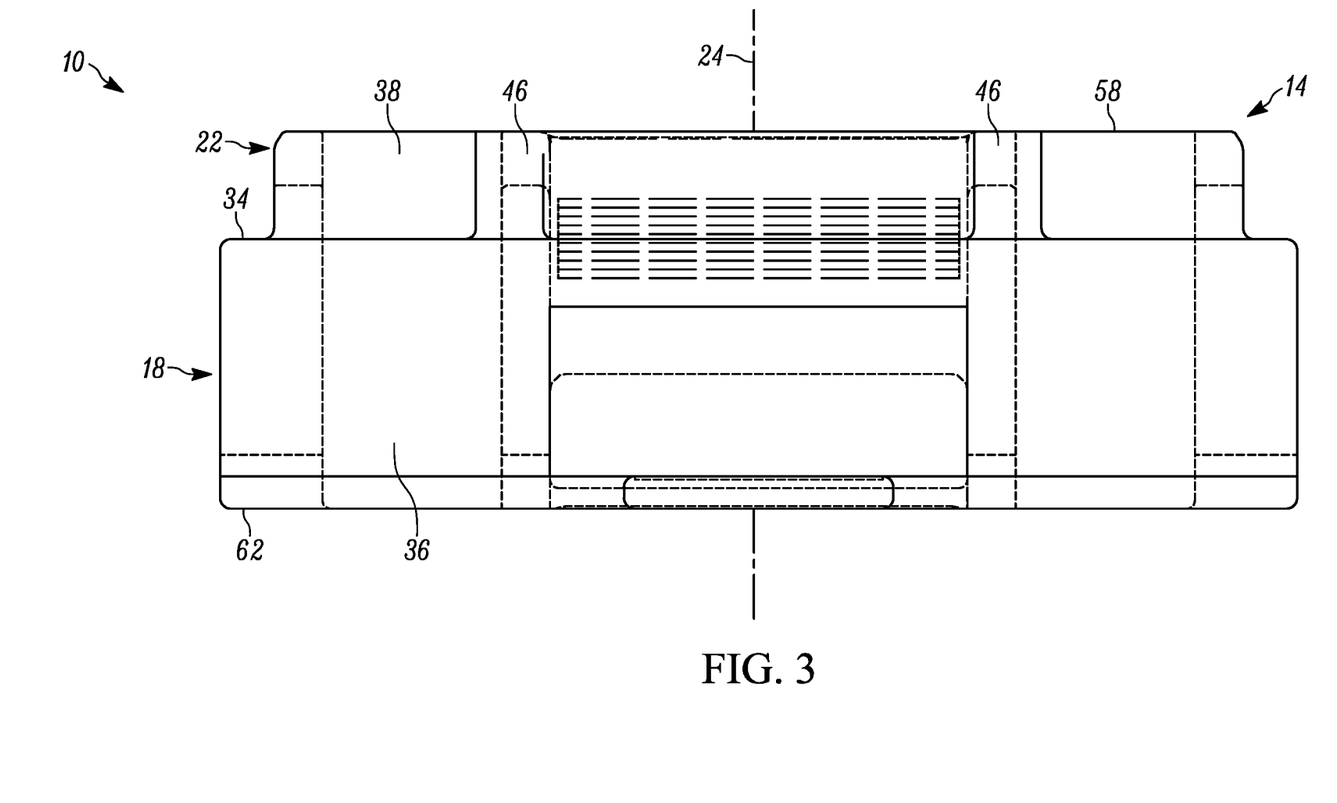
FIG. 3 is a side view of the securement member of FIG. 1.

As shown in FIGS. 2 and 3, the first portion 18 has a first surface or upper surface 34 and a second or side surface 36. The upper surface 34 is orthogonal to the side surface 36. The second portion 22 extends from the upper surface 34. The first portion 18 has a width greater than a width of the second portion 22 so that the upper surface 34 extends past the second portion. The intersection of the first portion 18 and the second portion 22 along the upper surface 34 forms a stepped surface. The stepped surface 34 is perpendicular to the body axis 24. In the illustrated embodiment, the upper surface 34 is symmetrically aligned along perpendicular planes extending through the body axis 24 (FIG. 3).

Figure 4A:
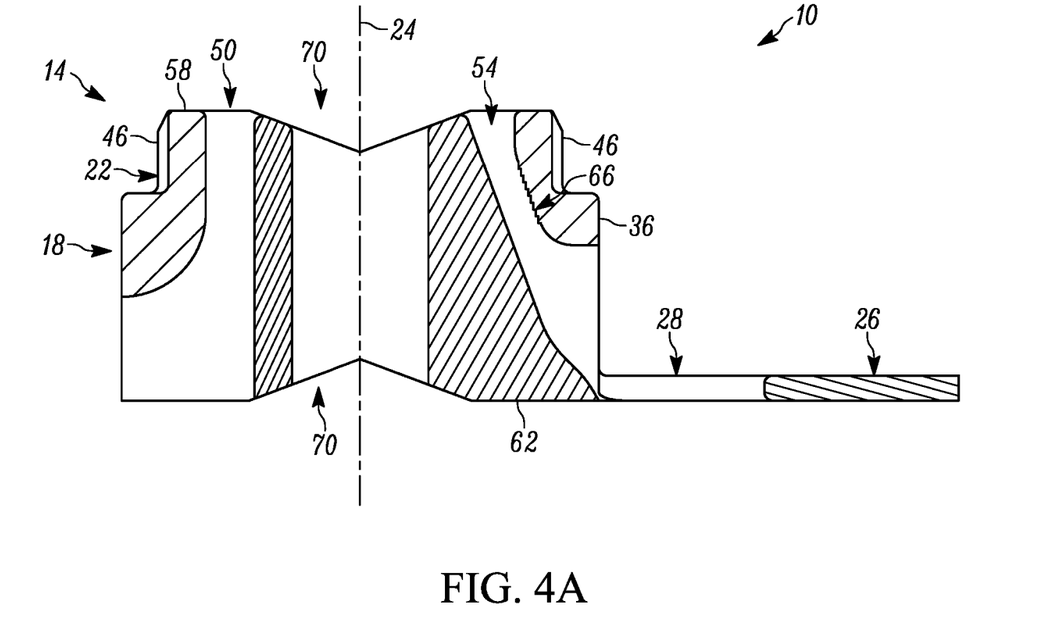
FIG. 4A is a cross-sectional view of the securement member of FIG. 2 taken along line 4-4.
Figure 4B:
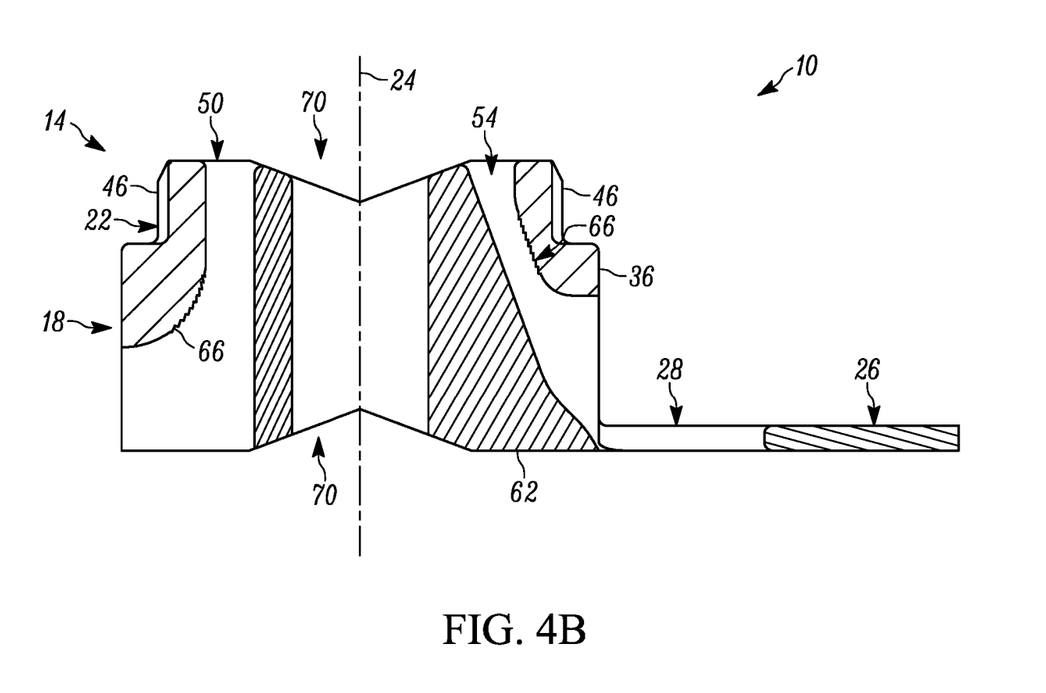
FIG. 4B is a cross-sectional view of another embodiment of a securement member taken along line 4-4.

The second portion 22 includes a first side 38 and a second side 42 opposite the first side 38. The first side 38 of the second portion 22 is positioned proximate the side surface 36 of the first portion 18. Both the side surface 36 and the first side 38 are adjacent the upper surface 34. The first side 38 and second side 42 are parallel to the side surface 36 and the body axis 24. Projections 46 also extend from the upper surface 34 and are adjacent to the first and second sides 38, 42 of the second portion 22. In the illustrated embodiment, the second portion 22 includes four projections 46 (FIG. 2). The projections 46 are spaced apart along the first side 38 and the second side 42 of the second portion 22. In the illustrated embodiment, two projections 46 are located on the first side 38 of the second portion 22 and two projections 46 are located on the second side 42 of the second portion 22. The projections 46 on the first side 38 are symmetric the projections 46 on the second side 42. The projections 46 also have a greater width proximate the first portion 18 than distal the first portion 18 (FIGS. 4A and 4B). In other words, the projections 46 taper along the first side 38 and the second side 42. The width of each projection 46 is also less than the width of the upper surface 34.

FIG. 2 also illustrates a first aperture 50 and a second aperture 54. In the illustrated embodiment, the first and second apertures 50, 54 have a rectangular opening. The first aperture 50 is positioned proximate the first side 38 and the second aperture 54 is positioned proximate the second side 42.

As shown in FIG. 4A, the first aperture 50 and the second aperture 54 extend between the first portion 18 and a first or upper surface 58 of the second portion 22. In the illustrated embodiment, the first aperture 50 extends substantially parallel to the body axis 24 while the second aperture 54 extends obliquely with respect to the body axis 24. The first aperture 50 extends between a third or lower surface 62 of the first portion 18 and the upper surface 58 of the second portion 22. The second aperture 54 extends between the side surface 36 of the first portion 18 and the upper surface 58 of the second portion 22. The second aperture 54 also includes a plurality of teeth 66. The plurality of teeth 66 are positioned on a surface of the second aperture 54 opposite the side surface 36 and the first side 38.

As shown in FIG. 4B, alternate embodiments of the main body 14 include a plurality of teeth 66 in the first aperture 50, as well as in the second aperture 54. The teeth 66 in the first aperture 50 is positioned on a surface of the first aperture 50 opposite the side surface 36 and the second side 42.

Returning to FIG. 4A, the lower surface 62 of the first portion 18 and the upper surface 58 of the second portion 22 have a substantially flat periphery perpendicular to the body axis 24 and an interior grooved portion 70. In the illustrated embodiment, the grooved portions 70 are V-shaped. The grooved portions 70 are also arranged in a double-concave orientation. In other words, openings of the grooved portions 70 are adjacent to the lower surface 62 or upper surface 58 respectively, and the grooved portions 70 curve toward a middle of the main body 14. In the illustrated embodiment, centers of the grooved portions 70 are aligned along the body axis 24.

Referring back to FIG. 1, the integrated spacer cable tie 10 also includes a tie or strap 26. The strap 26 is formed integrally with the first portion 18 of the main body 14. In a first position, the strap 26 is substantially coplanar with the lower surface 62 of the first portion 18 and the strap 26 also extends away from the main body 14 in a direction substantially orthogonal to the body axis 24 (FIGS. 4A and 4B). The strap 26 has a first width W1 proximate the main body 14 and a second width W2 less than the first width W1 (FIG. 2). In other words, the strap 26 tapers away from the main body 14. A majority of a length of the strap 26 has the second width W2. The length of the strap 26 is substantially greater than any dimension associated with the main body 14. The strap 26 also has an aperture 28 that is adjacent the second aperture 54 on the side surface 36 of the first portion 18. A width of the aperture 28 is less than the first width W1 of the strap 26.

The strap 26 includes teeth 30 on an upper surface 32 of the strap 26. The upper surface 32 of the strap 26 is adjacent to the side surface 36 of the first portion 18. The teeth 30 extend along a continuous portion of the length of the strap 26. In the illustrated embodiment, the teeth 30 span a width equal to the second width W2 of the strap 26.

Figure 5:
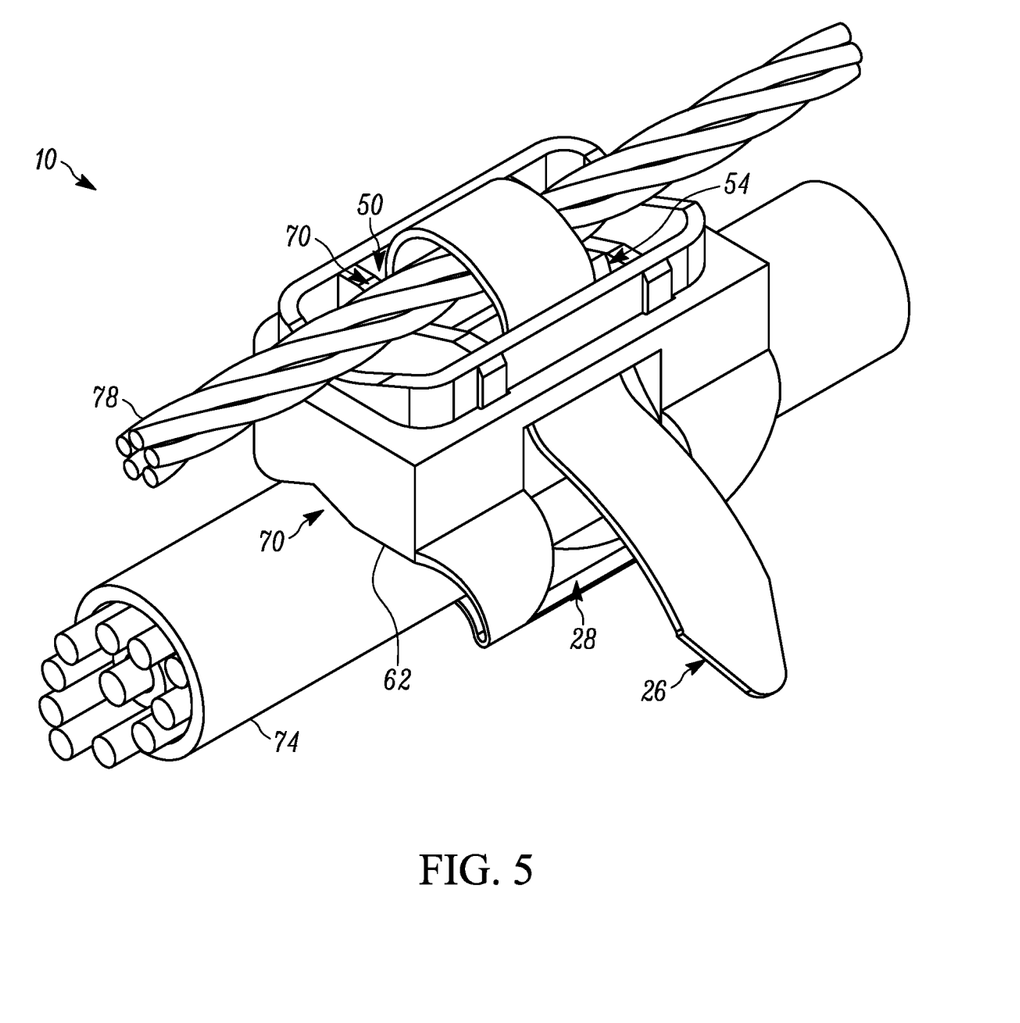
FIG. 5 is a perspective view of the securement member of FIG. 1 coupled to a first cable and a second cable.

As shown in FIG. 5, the integrated cable spacer tie 10 may couple to a first cable or electrical conductor 74 and a second cable or electrical conductor 78. The electrical conductors 74, 78 may be a single conductor or a bundle of conductors. The first conductor 74 and the second conductor 78 are each receivable within one of the grooved portions 70. The grooved portions 70 provide a surface for the electrical conductors 74, 78 to rest on. In the illustrated embodiment, the integrated cable spacer tie 10 is flexible in order to allow the integrated cable spacer tie 10 to couple to the electrical conductors 74, 78. The flexibility of the integrated cable spacer tie 10 allows the strap 26 to bend into a second position where the strap 26 is no longer co-planar with the lower surface 62. The strap 26 wraps around the first electrical conductor 74 and extends into the first aperture 50. The aperture 28 on the strap 26 may make it easier to bend the strap 26. Pulling the strap 26 tight through the first aperture 50 couples the first electrical conductor 74 against the grooved portion 70 proximate the lower surface 62.

The strap 26 then passes over the second electrical conductor 78 and through the second aperture 54. As the strap 26 passes through the second aperture 54, the teeth 66 of the second aperture 54 engage the teeth 30 of the strap 26. The teeth 30, 66 engage in a ratcheting manner and allow the strap 26 to continue to extend through the second aperture 54, but prevent the strap 26 from traveling in a reverse direction and backing out of the second aperture. Pulling the strap 26 tight through the first and second apertures 50, 54 prevent the first and second electrical conductors 74, 78 from translating along the body axis 24.

In the embodiment shown in FIG. 4B, as the strap 26 passes through the first aperture 50, the teeth 66 of the first aperture 50 engage the teeth 30 of the strap 26. The teeth 30, 66 engage in a ratcheting manner and allow the strap 26 to continue to extend through the first aperture 50, but prevent the strap 26 from traveling in a reverse direction and backing out of the first aperture 50. A user to couple the integrated cable spacer tie 10 to the first electrical conductor 74 without coupling the integrated cable spacer tie 10 to the second electrical conductor 78, or engaging the teeth 30 to the teeth 66 in the second aperture 54. This allows a user to couple the integrated cable spacer tie 10 to the electrical conductors 74, 78 one at a time.

Figure 6:
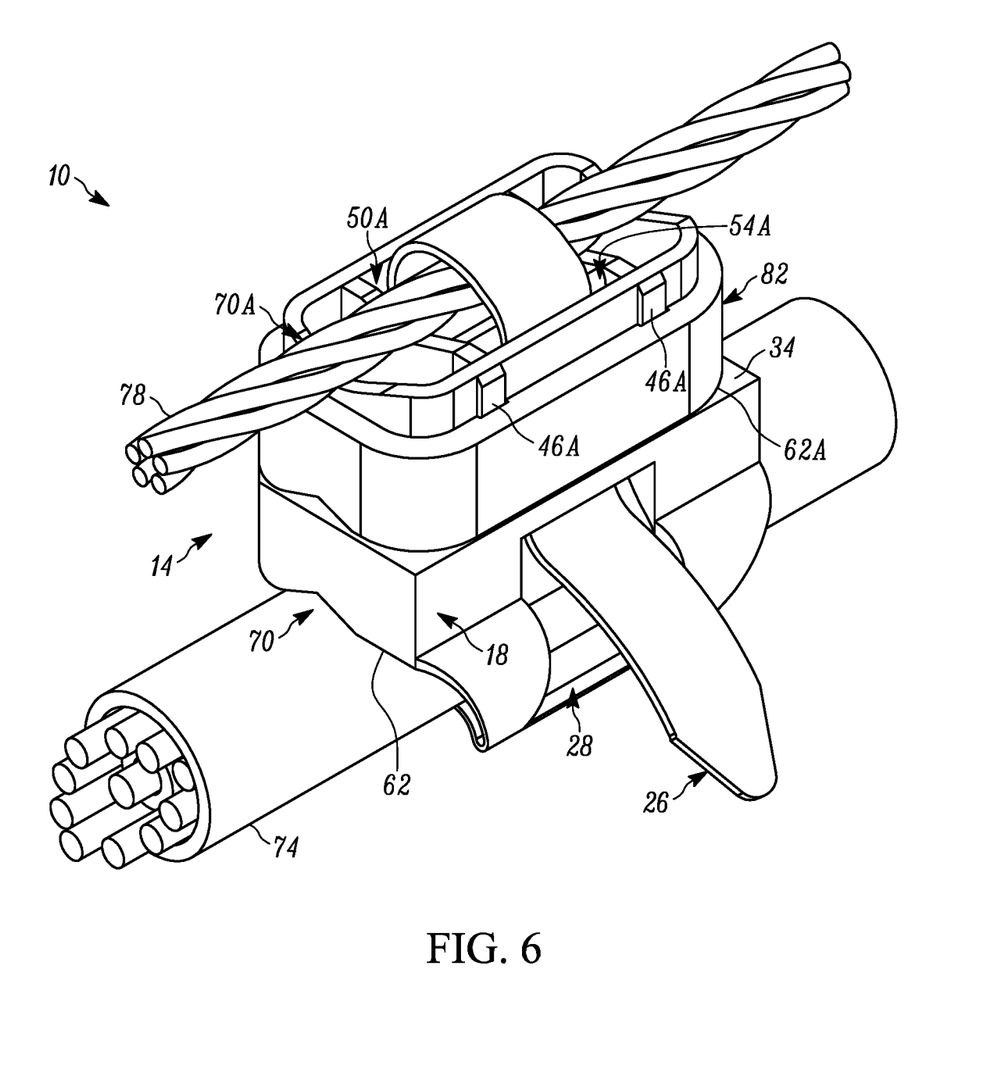
FIG. 6 is a perspective view of the securement member of FIG. 5 further coupled to a spacer to increase the distance between the first cable and the second cable.

As shown in FIG. 6, an adapter 82 may couple to the main body 14 proximate the upper surface 34 of the first portion 18 in order to provide additional spacing between the first electrical conductor 74 and the second electrical conductor 78. The adapter 82 is shaped substantially similar to the main body 14 of the integrated cable spacer tie 10. Common elements have the same reference number "A".

The similar shape between the adapter 82 and the main body 14 allows the adapter 82 to stack on top of the main body 14. The adapter 82 is positioned such that a lower surface 62A of the adapter abuts with the upper surface 34 of the first portion 18. Additionally, the adapter 82 has slots (not shown) on an inner surface that complements the projections 46 of the main body 14. The slots receive the projections 46 as the adapter 82 is coupled to the main body 14. Receiving the projections 46 within the slots provides a snap fit between the adapter 82 and the main body 14.

The first aperture 50A and the second aperture 54A of the adapter 82 align with the first aperture 50 and the second aperture 54 of the main body 14, respectively. The strap 26 passes through each first aperture 50, 50A and each second aperture 54, 54A in order to couple the electrical conductors 74, 78 to the main body 14. The adapter 82 may also include a grooved portion 70A to provide a surface for the electrical conductor 78 to rest on.

The adapter 82 also includes projections 46A. The projections 46A allow the adapter 82 to couple to another adapter (not shown) in the same manner in which the adapter 82 coupled to the main body 14. Connecting additional adapters 82 allows a user to further increase the spacing between electrical conductors 74, 78. In addition, an adapter 82 may support an electrical conductor while coupled between the main body 14 and another adapter 82, or between two other adapters 82. In other words, each adapter 82 coupled to the main body 14 may support an electrical conductor so that a user may space more than two electrical conductors apart. The length of the strap 26 relative to the main body 14 allows the strap to wrap around and secure the electrical conductors 74, 78 when numerous adapters 82 are coupled to the main body.

In an alternative embodiment (not shown), each integrated cable spacer tie 10 may couple to another integrated cable spacer tie 10 (not shown), as well as an adapter 82. In other words, a second integrated cable spacer tie 10 may be used in a similar manner as an adapter 82 and stacked directly on top of a first integrated cable spacer tie 10 or an adapter 82. The strap 26 may have a perforation, a crease, or another marking to indicate where the strap 26 may be removed from an upper (i.e., second) integrated cable spacer tie 10.

Further alternate embodiments of the integrated cable spacer tie 10, as well as alternate embodiments of the adapter 82, may have different heights in order to provide different spacing arrangements between electrical conductors. Additionally, the length of the strap 26 may vary in alternate embodiments to allow for greater or fewer adapters 82, or integrated cable spacer ties 10, to secure to the main body 14.

The integrated cable spacer tie 10 may be used on communication lines or in similar applications. In the illustrated embodiment, the integrated cable spacer tie 10 is black in order to provide protection from ultraviolet (UV) radiation.

Although aspects have been described in detail with reference to certain preferred embodiments, variations and modifications exist within the scope of one or more independent aspects as described.

What is claimed is:

1. A securement member for electrical conductors, the securement member comprising:
a main body including a longitudinal axis and a stepped surface, the stepped surface perpendicular to the longitudinal axis and the stepped surface extending along a perimeter of the main body;
a first aperture extending through the main body;
a second aperture extending through the main body;
a strap integrally formed with and extending away from the main body in a direction substantially orthogonal to the longitudinal axis, the strap having a width less than a width of the first aperture and the second aperture, wherein the strap is selectively receivable within the first aperture and the second aperture in order to secure electrical conductors to the main body,
wherein the main body includes a first portion and a second portion integrally formed with the first portion, the first portion and the second portion extending along the longitudinal axis, and wherein the stepped surface is positioned between the first portion and the second portion,
wherein the first portion includes a first grooved portion extending across the main body perpendicular to the longitudinal axis, the first grooved portion being positioned between the first aperture and the second aperture, and
wherein the second portion includes a first end, a second end opposite the first end, and a second grooved portion that is positioned between the first aperture and the second aperture, the second grooved portion including a first groove and a second groove, the first groove extending across the main body perpendicular to the longitudinal axis and being spaced apart from the first end of the second portion, the second groove extending across the main body perpendicular to the longitudinal axis and being spaced apart from the second end of the second portion, and wherein the strap is positionable between the first groove and the second groove when the strap is received in the first aperture and the second aperture.

2. The securement member of claim 1, wherein a surface of the strap includes teeth and the second aperture includes teeth, the teeth of the strap engage the teeth of the second aperture when the strap is received within the second aperture, wherein the engagement between the teeth of the strap and the teeth of the second aperture prevent the strap from being removed from the second aperture.

3. The securement member of claim 1, further comprising a projection extending from the stepped surface.

4. The securement member of claim 1, wherein the first aperture is substantially parallel to the longitudinal axis, the first aperture extends from an upper surface of the main body to a lower surface of the main body, the upper surface and the lower surface substantially perpendicular to the longitudinal axis.

5. The securement member of claim 1, wherein the second aperture is angled obliquely with respect to the longitudinal axis, the second aperture extends from an upper surface of the main body to a side surface of the main body, the upper surface substantially perpendicular to the longitudinal axis and the side surface substantially parallel to the longitudinal axis.

6. The securement member of claim 1, wherein the strap initially extends through the first aperture in a first direction along the longitudinal axis and then extends though the second aperture in a second direction along the longitudinal axis, the first direction opposite the second direction.

7. The securement member of claim 1, wherein a width of a projection extending from the stepped surface is less than a width of the stepped surface, an adapter configured to abut the stepped surface when coupled to the main body.

8. A securement member for securing electrical conductors, the securement member comprising:

a main body including a first portion, a second portion integrally formed with the first portion, the first portion and the second portion extending along a longitudinal axis, and a stepped surface being orthogonal to the longitudinal axis and being positioned between the first portion and the second portion, the stepped surface extending along at least a portion of a perimeter of the main body and including a projection configured to engage an adapter;

a first aperture extending through the main body;

a second aperture extending through the main body;

a strap integrally formed with and extending away from the main body in a direction substantially orthogonal to the longitudinal axis, the strap having a width less than a width of the first aperture and the second aperture, wherein the strap selectively receivable within the first aperture and the second aperture in order to secure electrical conductors to the main body, wherein the first portion includes a first grooved portion extending across the main body perpendicular to the longitudinal axis, the first grooved portion is positioned between the first aperture and the second aperture, and wherein the second portion includes a first end, a second end opposite the first end, and a second grooved portion, the second grooved portion being positioned between the first aperture and the second aperture, the second grooved portion including a first groove and a second groove, the first groove extending across the main body perpendicular to the longitudinal axis and being spaced apart from the first end of the second portion, the second groove extending across the main body perpendicular to the longitudinal axis and being spaced apart from the second end of the second portion, and wherein the strap is positionable between the first groove and the second groove when the strap is received in the first aperture and the second aperture.

9. The securement member of claim 8, wherein a surface of the strap includes teeth and the second aperture includes teeth, the teeth of the strap engaging the teeth of the second aperture when the strap is received within the second aperture, wherein the engagement between the teeth of the strap and the teeth of the second aperture prevent the strap from being removed from the second aperture.

10. The securement member of claim 8, wherein the first aperture is substantially parallel to the longitudinal axis, the first aperture extends between an upper surface of the second portion and a lower surface of the first portion, the upper surface and the lower surface substantially perpendicular to the longitudinal axis.

11. The securement member of claim 8, wherein the second aperture is angled obliquely with respect to the longitudinal axis, the second aperture extends between an upper surface of the second portion and a side surface of the first portion, the upper surface substantially perpendicular to the longitudinal axis and the side surface substantially parallel to the longitudinal axis.

12. The securement member of claim 8, wherein the strap initially extends through the first aperture in a first direction along the longitudinal axis and then extends though the second aperture in a second direction along the longitudinal axis, the first direction opposite the second direction.

13. The securement member of claim 12, wherein
the adapter is configured to abut the stepped surface, the adapter shaped similarly to the main body and including a first aperture configured to align with the first aperture of the main body and a second aperture configured to align with the second aperture of the main body; and
the strap extending through the first aperture of the main body and the first aperture of the adapter in a first direction along the longitudinal axis and then extending through the second aperture of the main body and the second aperture of the adapter in a second direction along the longitudinal axis.

14. The securement member of claim 13, wherein the adapter includes a grooved portion, a first end, and a second end opposite the first end, the grooved portion of the adapter being positioned between the first aperture of the adapter and the second aperture of the adapter, the grooved portion of the adapter including a first groove spaced apart from a first end of the adapter and a second groove spaced apart from a second end of the adapter, and wherein the strap is positionable between the first groove of the adapter and the second groove of the adapter when the strap is received in the first aperture of the adapter and the second aperture of the adapter.

15. The securement member of claim 8, wherein a width of the projection is less than a width of the stepped surface, the adapter configured to abut the stepped surface when coupled to the main body.

16. The securement member of claim 8, wherein the projection is a first projection, the securement member further comprising a second projection extending from the stepped surface, the first and second projections spaced apart from one another.

* * * * *